US007629406B2

(12) United States Patent
Qian et al.

(10) Patent No.: US 7,629,406 B2
(45) Date of Patent: Dec. 8, 2009

(54) USE OF ORGANOCLAY IN HDPE NANOCOMPOSITES TO PROVIDE BARRIER PROPERTIES IN CONTAINERS AND FILM

(75) Inventors: Guoqiang Qian, Buffalo Grove, IL (US); David Jarus, Shaker Heights, OH (US); Vincent Zabrocki, Massillon, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 12/280,855

(22) PCT Filed: Mar. 5, 2007

(86) PCT No.: PCT/US2007/063258

§ 371 (c)(1),
(2), (4) Date: Oct. 3, 2008

(87) PCT Pub. No.: WO2007/106671

PCT Pub. Date: Sep. 20, 2007

(65) Prior Publication Data

US 2009/0036580 A1 Feb. 5, 2009

Related U.S. Application Data

(60) Provisional application No. 60/781,852, filed on Mar. 13, 2006.

(51) Int. Cl.
*C08K 9/04* (2006.01)
*B60C 1/00* (2006.01)
(52) U.S. Cl. ...................... 524/445; 524/261
(58) Field of Classification Search ................. 524/445
See application file for complete search history.

(56) References Cited

U.S. PATENT DOCUMENTS

| 6,447,860 | B1 | 9/2002 | Mueller et al. |
| 6,599,622 | B1 | 7/2003 | Chu et al. |
| 6,610,781 | B1 | 8/2003 | Zhou et al. |
| 6,737,472 | B2 | 5/2004 | Zhou et al. |
| 6,884,834 | B2 | 4/2005 | Reinking et al. |
| 2004/0106719 | A1 | 6/2004 | Kim et al. |
| 2004/0260000 | A1 * | 12/2004 | Chaiko ........................ 524/445 |

OTHER PUBLICATIONS

Polymer Handbook, Abe A. and Bloch D.R. eds., John Wiley & Sons, Inc., New York, 1999, p. V/164.*

* cited by examiner

*Primary Examiner*—Ling-Siu Choi
*Assistant Examiner*—Hui Chin
(74) *Attorney, Agent, or Firm*—John H. Hornickel

(57) ABSTRACT

HDPE nanocomposite is made by mixing HDPE with organoclay. Such HDPE nanocomposite contains concentrations of organoclay less than 4 weight percent. Unexpectedly, using less organoclay than that conventionally recommended, results in superior oxygen and water vapor transmission rates for HDPE compounds. The HDPE nanocomposite is useful for packaging films and containers for food or other perishables.

20 Claims, No Drawings

USE OF ORGANOCLAY IN HDPE NANOCOMPOSITES TO PROVIDE BARRIER PROPERTIES IN CONTAINERS AND FILM

CLAIM OF PRIORITY

This application claims priority from U.S. Provisional Patent Application Ser. No. 60/781,852 filed on Mar. 13, 2006, which is incorporated by reference.

FIELD OF THE INVENTION

This invention concerns composites of high density poly(ethylene) (HDPE) which contain concentrations of organoclay no greater than four weight percent.

BACKGROUND OF THE INVENTION

The mixture of organoclays and polyolefins, commonly called nano-olefins, is highly desired because the organoclays can contribute barrier properties to polyolefins for food packaging and other situations where the contained product within packaging must not leach, escape, or decay. Polyolefins for packaging have been useful since the mid-$20^{th}$ Century. Organoclays, smectite inorganic clays intercalated with organic ions, such as quaternary ammonium, have become useful in the last decade.

Organoclays are expensive additives for polyolefins such as HDPE. Nonetheless, several others have taught the use of organoclays as additives for HDPE among other resins. Representative examples of such prior work include U.S. Pat. No. 6,447,860 (Mueller et al.); U.S. Pat. No. 6,610,781 (Zhou et al.); and U.S. Pat. No. 6,884,834 (Reinking et al.). All of these prior efforts provide generalized ranges of organoclay in HDPE compounds.

SUMMARY OF THE INVENTION

In various publications by PolyOne Corporation, a maker of a variety of concentrates in organoclay in various polyolefin resins for dilution into polyolefin matrices, PolyOne has consistently recommended at least 4 weight percent of organoclay to begin to see improvement in barrier properties of the resulting compound.

Quite unexpectedly, it has been found the amount of organoclay in HDPE compounds does not follow the expected rule of greater barrier performance with increases in organoclay concentration. For reasons not as yet known with scientific certainty, it has been found that increasing the concentration of organoclay from three weight percent to nine percent actually reduces effective oxygen barrier properties of a HDPE nanocomposite. Even more surprisingly, in other embodiments, it has been found that increasing the concentration of organoclay from three weight percent to six weight percent also reduces the amount of both oxygen and water vapor barrier performance properties.

Thus, one aspect of this invention is a method of using organoclay to improve barrier properties of HDPE, comprising mixing no more than about four weight percent of organoclay into HDPE to form a nano-HDPE compound.

Another aspect of the present invention is the article made from the nano-HDPE compound, wherein the article has a lower water vapor transmission rate and a lower oxygen permeability than if the compound were to contain more than about four weight percent of organoclay.

Another aspect of the present invention is a film made from the nano-HDPE compound, wherein the article has a lower water vapor transmission rate and a lower oxygen permeability than if the compound were to contain more than about four weight percent of organoclay.

Features and advantages of the invention will be explained below while discussing the embodiments.

EMBODIMENTS OF THE INVENTION

HDPE

High density poly(ethylene) is a thermoplastic resin known throughout the world as useful in the manufacturing of packaging film and containers for use with food and other perishables. For purposes of this invention, "high density poly(ethylene)" or "HDPE" means polyethylene resins which have a specific gravity above 0.935 and preferably between about 0.935 and 0.950. Any HDPE commercially available and approved for use with food or other perishables is suitable for use in the present invention. Non-limiting examples of commercially available HDPE include Unival brand HDPE from Dow Chemical Company, Alathon brand HDPE from Equistar, or Paxon brand HDPE from Exxon Mobil, with specific grades such as Marflex 9608XD brand HDPE from Chevron Phillips Chemical.

Organoclays

Organoclay is obtained from inorganic clay usually from the smectite family. Smectites have a unique morphology, featuring one dimension in the nanometer range. Montmorillonite clay is the most common member of the smectite clay family. The montmorillonite clay particle is often called a platelet, meaning a sheet-like structure where the dimensions in two directions far exceed the particle's thickness.

Inorganic clay becomes commercially significant if intercalated with an organic intercalant to become an organoclay. An intercalate is a clay-chemical complex wherein the clay gallery spacing has increased, due to the process of surface modification by an intercalant. Under the proper conditions of temperature and shear, an intercalate is capable of exfoliating in a resin matrix, such as HDPE or other polyolefins. An intercalant is an organic or semi-organic chemical capable of entering the montinorillonite clay gallery and bonding to the surface. Exfoliation describes a dispersion of an organoclay (surface treated inorganic clay) in a plastic matrix. In this invention, organoclay is exfoliated at least to some extent.

In exfoliated form, inorganic clay platelets have a flexible sheet-type structure which is remarkable for its very small size, especially the thickness of the sheet. The length and breadth of the particles range from 1.5 μm down to a few tenths of a micrometer. However, the thickness is astoundingly small, measuring only about a nanometer (a billionth of a meter). These dimensions result in extremely high average aspect ratios (200-500). Moreover, the miniscule size and thickness mean that a single gram contains over a million individual particles.

Nanocomposites are the combination of the organoclay and the plastic matrix. In polymer compounding, a nanocomposite is a very convenient means of delivery of the inorganic clay into the ultimate compound, provided that the plastic matrix is compatible with the principal polymer resin components of the compounds. In such manner, nanocomposites are available in concentrates, masterbatches, and compounds from Nanocor, Inc. of Arlington Heights, Ill. (www.nanocor.com) and PolyOne Corporation of Avon Lake, Ohio (www.polyone.com) in a variety of nanocomposites. Particularly preferred organoclays are 124P, 130P, and 144P from Nanocor, Inc. PolyOne markets HDPE nanoconcentrates, such as Nanoblend™ 2201 brand concentrate.

Nanocomposites offer flame-retardancy properties because such nanocomposite formulations burn at a noticeably reduced burning rate and a hard char forms on the surface. They also exhibit minimum dripping and fire sparkling.

HDPE nanocomposites achieve barrier properties useful in films, fibers, and other forms. Barrier properties can be measured as transmission rates, namely for oxygen transmission rates in the units of cc-mil/100 in$^2$-day and for water vapor transmission rates, g-mil/m$^2$-day, respectively, but also need to be indexed against the thickness of the sample being tested. A convenient form of indexing is percentage reduction in oxygen permeability when a HDPE nanocomposite is compared with the HDPE composite without organoclay. HDPE nanocomposites made according to the present invention can have a percentage reduction in oxygen permeability of at least 50% and preferably at least 60%, when measured at 0% relative humidity using a nominal 0.002 inches thick film. HDPE nanocomposites made according to the present invention can have a percentage reduction in water vapor transmission rates of at least 20% and preferably at least 40%, when measured at 100% relative humidity using a nominal 0.002 inches thick film.

Unexpectedly, in comparison to other polyolefins which require the addition of at least 4 wt. % of organoclay to a polyolefin compound, it is totally surprising that these barrier performance properties are achieved with less than about 3 wt. % of organoclay concentration in HDPE, a reduction of 25% of expensive organoclay, and preferably less than about 3 wt. % of organoclay concentration.

In other words, the same or superior barrier performance properties are obtained with as much as 25% reduction of the conventional concentration of organoclay in the final thermoplastic compound used to make the packaging firm or container.

Moreover, it is known that the higher the specific gravity of the HDPE, the more brittle the HDPE becomes. Nonetheless before the use of organoclay in HDPE according to the present invention, one skilled in the art was willing to use a higher specific gravity HDPE to achieve desired barrier properties even if it meant the article or film was more brittle as a result.

With HDPE nanocomposites of the present invention, one can employ HDPE resins having specific gravity between about 0.935 and 0.950, where brittleness is not as severe, and still achieve the desired barrier properties. Unexpectedly, one can have both acceptable flexibility and barrier properties according to the present invention.

Optional Additives

The HDPE nanocomposite of the present invention can include conventional plastics additives in an amount that is sufficient to obtain a desired processing or performance property for the ultimate thermoplastic compound, but in a manner that does not disrupt the desired barrier performance properties.

The amount should not be wasteful of the additive nor detrimental to the processing or performance of the compound. Those skilled in the art of thermoplastics compounding, without undue experimentation but with reference to such treatises as Plastics Additives Database (2004) from Plastics Design Library (www.williamandrew.com), can select from many different types of additives for inclusion into the HDPE nanocomposites of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Optional Polymers

While the HDPE nanocomposite can be made without other polymers present, it is optional to introduce other polymers into the extruder for a variety of ultimate compound properties and performances, but in a manner that does not disrupt the barrier performance property of the HDPE nanocomposite. These materials can be blended, co-extruded, or otherwise laminated with the HDPE for composite structures. Other resins include those selected from the group consisting of polyolefins, polyimides, polyarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

Table 1 shows ranges of acceptable, desirable, and preferred weight percents of the various ingredients for addition to the extruder, relative to the total weight of the HDPE nanocomposite emerging from the extruder, all being expressed as approximate values. Because the additives and other polymers are optional, the low end of each range is zero.

TABLE 1

Weight Percent of Ingredients

| Ingredients | Acceptable (Wt. %) | Desirable (Wt. %) | Preferred (Wt. %) |
|---|---|---|---|
| HDPE nanocomposite | 10-100 | 30-95 | 50-90 |
| Optional Additives | 0-70 | 0-50 | 0-30 |
| Optional Polymers | 0-90 | 0-65 | 0-50 |

Extruder Processing

The preparation of compounds of the present invention is uncomplicated. The compound of the present can be made in batch or continuous operations. The compound can start from a concentrate of organoclay in a thermoplastic (also called a masterbatch) or original ingredients.

Mixing occurs in an extruder that is elevated to a temperature that is sufficient to melt the HDPE, any optional concentrate thermoplastic matrix in a concentrate, and any optional other polymers and to adequate disperse the organoclay and optional additives therewithin.

Extruders have a variety of screw configurations, including but not limited to single and double, and within double, co-rotating and counter-rotating. Extruders also include kneaders and continuous mixers, both of which use screw configurations suitable for mixing by those skilled in the art without undue experimentation. In the present invention, it is preferred for chain extension to use a twin co-rotating screw in an extruder commercially available from Coperion Werner-Pfleiderer GmbH of Stuttgart, Germany.

Extruders have a variety of heating zones and other processing parameters that interact with the elements of the screw(s). Extruders can have temperatures and other conditions according to acceptable, desirable, and preferable ranges as shown in Table 2.

TABLE 2

Processing Conditions

| Condition | Acceptable | Desirable | Preferred |
|---|---|---|---|
| Zones 1-5 Temp. | 170° C.-230° C. | 180° C.-220° C. | 190° C. |
| Zones 6-7 Temp. | 180° C.-240° C. | 180° C.-230° C. | 200° C. |

TABLE 2-continued

| | Processing Conditions | | |
|---|---|---|---|
| Condition | Acceptable | Desirable | Preferred |
| Zones 8-9 Temp. | 190° C.-240° C. | 190° C.-230° C. | 200° C. |
| Die Temp. | 190° C.-240° C. | 190° C.-230° C. | 200° C. |
| Screw Rotation | 300-1100 rpm | 400-1000 rpm | 600 rpm |
| Feeder Rate | 50-95% of available drive torque | 75-95% of available drive torque | 90-95% of available drive torque |

Location of ingredient addition into the extruder can be varied according the desired duration of dwell time in the extruder for the particular ingredient. Table 3 shows acceptable, desirable, and preferable zones when ingredients are to be added in the process of the present invention.

TABLE 3

| Ingredient Addition Points | |
|---|---|
| Ingredient | Acceptable Zone(s) |
| HDPE | Throat |
| Organoclay | Throat |
| Optional Additives | Throat |
| Optional Polymers | Throat or Downstream or Both |

Extruder speeds can range from about 50 to about 1200 revolutions per minute (rpm), and preferably from about 300 to about 600 rpm.

Typically, the output from the extruder is pelletized for later extrusion or molding into polymeric articles.

Subsequent Processing

The HDPE nanocomposite made according to the present invention can serve either as a concentrate or as a compound. If the former, then the HDPE nanocomposite is an intermediate product, an ingredient to be added with other ingredients to subsequent compounding steps in a batch or continuous mixing apparatus. The dilution or "let-down" of the concentrate into the compound can result in an organoclay concentration in the compound ranging from about 0.25 to less than 4 weight percent, and preferably from about 0.5 to about 3 weight percent, to maximize oxygen and water vapor barrier performance properties with minimal concentration of organoclay in the HDPE nanocomposite.

Ultimately, the compound is formed into an article or film using a subsequent extrusion or molding techniques. These techniques are well known to those skilled in the art of thermoplastics polymer engineering. Without undue experimentation but using references such as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make films of any laminate structure or articles of any conceivable shape and appearance using HDPE nanocomposites of the present invention.

Usefulness of the Invention

HDPE nanocomposites of the present invention are useful for making packaging film, closures, coatings, and containers of all shapes for food and other perishables. Films can be a single layer or multi-layer laminates. Any of the articles of the present invention can be made to have a particular color by use of color concentrates from PolyOne Corporation. Thus, conventional food and other perishable packaging can have the addition of increased oxygen and water vapor barrier performance without loss of other structural, functional, or cosmetic properties important in the marketing of products to the general consuming public. The increased oxygen and water vapor barrier performance is provided with a minimal amount of organoclay, contrary to prior teachings and logic that the greater the presence of a material in a compound, the better it performs.

Further embodiments of the invention are described in the following Examples.

EXAMPLES

Table 4 shows the formulations for Comparison Examples A-E and Examples 1-3 using commercially available materials.

TABLE 4

| | Compound Formulations | | | |
|---|---|---|---|---|
| | Concentrate NB 2201 (PolyOne) | Concentrate NB1001 (PolyOne) | Marflex 9608XD HDPE (Chevron Phillips) | PP 4772 (ExxonMobil) |
| Comp. A | 0 | | 100 | |
| 1 | 7.5 | | 92.5 | |
| 2 | 15 | | 85 | |
| 3 | 22.5 | | 77.5 | |
| Comp. B | | 0 | | 100 |
| Comp. C | | 7.5 | | 92.5 |
| Comp. D | | 15 | | 85 |
| Comp. E | | 22.5 | | 77.5 |

Comparison Example A and Examples 1-3 were analyzed on a MOCON Permatran-W 700 instrument according to ASTM F1249 to measure water vapor transmission using the parameters of Table 5 and a MOCON Oxtran 702 instrument according to ASTM D3985 using the parameters of Table 6. The Comparison Examples B-E were tested on a Oxtran 2/60 in an identical fashion to the HDPE samples (Comparative A and 1-3), except that the carrier gas was set at 65% RH.

TABLE 5

| Water Vapor Transmission Rate Test Conditions | | | |
|---|---|---|---|
| Test Gas | Water Vapor | Test Temperature | 23° C. (73.4° F.) |
| Test Gas Concentration | N/A | Carrier Gas | Nitrogen |
| Test Gas Humidity | 100% RH | Carrier Gas Humidity | 0% RH |

TABLE 6

| Oxygen Transmission Rate Test Conditions | | | |
|---|---|---|---|
| Test Gas | Oxygen | Test Temperature | 23° C. (73.4° F.) |
| Test Gas Concentration | 100% (1 atm) | Carrier Gas | 98% $N_2$, 2% $H_2$ |
| Test Gas Humidity | 0% RH | Carrier Gas Humidity | 0% RH |

Table 7 shows the results of the oxygen and water vapor transmission barrier tests. Samples were cast into films of a nominal 0.002 inches thick (0.05 mm) for barrier testing.

TABLE 7

Barrier Test Results

| | Resin | Wt. % of Clay | OTR (cc/100 in²/day) | % OTR Decrease from 0% Clay | WVTR (grams/100 in²/day) | % WVTR Decrease from 0% Clay |
|---|---|---|---|---|---|---|
| Comp. A | HDPE | 0 | 123.0 | — | 0.0428 | — |
| 1 | HDPE | 3 | 46.40 | 62.3 | 0.0228 | 46.7 |
| 2 | HDPE | 6 | 48.55 | 60.5 | 0.0281 | 34.3 |
| 3 | HDPE | 9 | 49.35 | 59.9 | 0.0320 | 25.2 |
| Comp. B | PP | 0 | 74.7 | — | | |
| Comp. C | PP | 3 | 61.4 | 17.8 | | |
| Comp. D | PP | 6 | 58.5 | 21.7 | | |
| Comp. E | PP | 9 | 53.7 | 28.2 | | |

Addition of organoclay into both HDPE and polypropylene (PP) improved oxygen barrier properties but with two very different results. All of Examples 1-3 show dramatically oxygen transmission rate decrease (OTR), at least about 60%, when compared with Comparison Example A. That performance in HDPE was at least double the performance of Comparison Examples C-E (17.8-28.2%) vis-à-vis Comparison Example B for PP.

But consider the difference in oxygen permeability percent reduction within the sets of Examples 1-3 and Comparison Examples C-E. The lowest rate among Examples 1-3 is Example 1, which contains 50% of the organoclay of Example 2 and 33% of the organoclay of Example 3. This is surprising, unexpected, and counterintuitive. Proof of that counter-intuition is shown by the % OTR Decrease within Comparison Examples C-E where the values increase as organoclay content increases. Thus, a polypropylene nanocomposite shows conventional, logical progression of greater oxygen barrier performance properties with increasing concentration of organoclay, whereas a HDPE nanocomposite of the present invention does exactly the opposite.

Water vapor transmission rates (WVTR) are shown for the set of Comparison Example A and Examples 1-3 to demonstrate that the OTR results are not an anomaly for barrier properties. As with OTR, the WVTR reduction percentage within the sequence of Examples 1-3 is best with Example 1. Again, this is illogical, counterintuitive and unexpected, demonstrating that selection for HDPE of a specific concentration of organoclay of less than three weight percent achieves superior MVTR barrier performance properties to a HDPE nanocomposite containing at least nine weight percent organoclay.

Moreover, the MVTR % reduction for HDPE is vastly superior to MVTR % reduction for PP. Whereas there is no reduction at all for PP until an organoclay content reaches between 6 percent and 9 percent, the MVTR % reduction for HDPE in Example 1 is nearly twice the amount as in Example 3, which has three times the amount of organoclay.

No less significant to the unexpectedness of the interaction of HDPE and organoclay of the present invention, as compared with the PP-organoclay of Comparison Examples B-E is that the type of intercalated clay in the two concentrates is the same. Therefore, use of a HDPE nanocomposite of the present invention provides superior results for containers and packaging films which require both oxygen and moisture vapor barrier properties, and those superior results of HDPE over PP, for example, are made even more superior by using less organoclay, not more.

The invention is not limited to the above embodiments. The claims follow.

What is claimed is:

1. A method of using organoclay to improve barrier properties of high density poly(ethylene), comprising the step of mixing organoclay into the high density poly(ethylene) to form a nano-high density poly(ethylene) compound, wherein the amount of organoclay is greater than 0 and less than about 4 weight percent.

2. The method of claim 1, wherein the high density poly(ethylene) has a specific gravity above 0.935.

3. The method of claim 1, wherein the high density poly(ethylene) is a grade and quality approved for use with food or other perishables.

4. The method of claim 1, wherein the organoclay is a smectite clay.

5. The method of claim 1, wherein the organoclay is a montmorillonite clay.

6. The method of claim 1, wherein the organoclay is intercalated with an organic intercalant.

7. The method of claim 1, further comprising the step of forming the compound into a film, and wherein the film has a lower water vapor transmission rate and a lower oxygen permeability than if the compound were to contain more than about four weight percent of organoclay.

8. The method of claim 1, wherein the amount of organoclay is greater than 0 and less than about 3 weight percent of the compound.

9. The method of claim 1, further comprising mixing an additive into the compound in a sufficient amount to obtain a desired processing or performance property, wherein the additive is selected from the group consisting of adhesion promoters; antibacterial biocides, fungicidal biocides, mildewcides, anti-fogging agents; anti-static agents; bonding, blowing and foaming agents; dispersants; fillers; extenders; fire retardants; flame retardants; smoke suppressants; impact modifiers; initiators; lubricants: micas; pigments; colorants; dyes; plasticizers; processing aids; release agents; silanes, titanates and zirconates; slip agents; anti-blocking agents; stabilizers; stearates; ultraviolet light absorbers; viscosity regulators; waxes; and combinations of them.

10. The method of claim 1, further comprising mixing another polymer into the compound, wherein the compound is selected from the group consisting of polyolefins, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

11. An article formed from a compound comprising high density poly(ethylene) and greater than 0 and less than about four weight percent of organoclay, wherein the article has a lower water vapor transmission rate and a lower oxygen permeability than if the compound were to contain more than about four weight percent of organoclay.

12. The article of claim 11, wherein the high density poly(ethylene) has a specific gravity above 0.935.

13. The article of claim 11, wherein the high density poly(ethylene) is a grade and quality approved for use with food or other perishables.

14. The article of claim 11, wherein the organoclay is a smectite clay.

15. The article of claim 11, wherein the organoclay is a montmorillonite clay.

16. The article of claim 11, wherein the organoclay is intercalated with an organic intercalant.

17. The article of claim 11, wherein the amount of organoclay is less than about 3 weight percent of the compound.

18. The article of claim 11, further comprising mixing an additive into the compound in a sufficient amount to obtain a desired processing or performance property, wherein the additive is selected from the group consisting of adhesion promoters; antibacterial biocides, fungicidal biocides, mildewcides, anti-fogging agents; anti-static agents; bonding, blowing and foaming agents; dispersants; fillers; extenders; fire retardants; flame retardants; smoke suppressants; impact modifiers; initiators; lubricants; micas; pigments; colorants; dyes; plasticizers; processing aids; release agents; silanes, titanates and zirconates; slip agents; anti-blocking agents; stabilizers; stearates; ultraviolet light absorbers; viscosity regulators; waxes; and combinations of them.

19. The article of claim 11, further comprising another polymer mixed into the compound, wherein the compound is selected from the group consisting of polyolefins, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

20. The article of claim 11, wherein the article is a film.

* * * * *